(12) United States Patent
Fukui et al.

(10) Patent No.: US 6,239,390 B1
(45) Date of Patent: May 29, 2001

(54) PERSONAL COMPUTER KEYBOARD

(75) Inventors: Koichiro Fukui, Tochigi; Shunta Ushioda, Ibaraki; Ichizo Tsukuda, Osaka, all of (JP)

(73) Assignee: Showa Aluminum Corporation, Osaka (JP)

( * ) Notice: Subject to any disclaimer, the term of this patent is extended or adjusted under 35 U.S.C. 154(b) by 0 days.

(21) Appl. No.: 09/518,653

(22) Filed: Mar. 3, 2000

(30) Foreign Application Priority Data

Mar. 4, 1999 (JP) .................................................. 11-056786

(51) Int. Cl.$^7$ ........................................................ H01H 9/26
(52) U.S. Cl. ............................................. 200/5 A; 361/688
(58) Field of Search .................................... 200/204, 5 A, 200/512–517, 314–344; 361/687, 688

(56) References Cited

U.S. PATENT DOCUMENTS

| | | | | |
|---|---|---|---|---|
| 3,591,749 | * | 7/1971 | Comstock | 200/167 R |
| 4,991,647 | * | 2/1991 | Kawabe et al. | 165/134.1 |
| 5,598,320 | * | 1/1997 | Toedtman et al. | 361/687 |
| 5,796,581 | * | 8/1998 | Mok | 361/687 |
| 5,803,744 | * | 9/1998 | Yen | 434/227 |
| 5,946,187 | * | 8/1999 | Cipolla | 361/687 |
| 5,992,155 | * | 11/1999 | Kobayashi et al. | 62/3.7 |
| 6,031,716 | * | 2/2000 | Cipolla et al. | 361/687 |
| 6,043,977 | * | 3/2000 | Nakajima | 361/687 |

FOREIGN PATENT DOCUMENTS 3-8229 * 3/1991 (JP) .

* cited by examiner

*Primary Examiner*—Lincoln Donovan
*Assistant Examiner*—Nhung Nguyen

(57) ABSTRACT

Provided is a personal computer keyboard in which base and reinforcement plates excellent in heat dissipativity and homogeneous in heat dissipation, and with a mechanical strength are incorporated.

The keyboard includes a base plate 24 on which key caps K1 to K9 are mounted; and a reinforcement plate 25 disposed on the lower side of the base plate 24, wherein the base plate 24 is constituted of an Al—Mg—Si based alloy plate including 0.2 to 0.8 wt % of Si, 0.3 to 0.9 wt % of Mg, 0.35 wt % or less of Fe and 0.20 wt % or less of Cu with the rest of Al and inevitable impurities and wherein the reinforcement plate 25 is constituted of a heat pipe panel.

10 Claims, 2 Drawing Sheets

PERSONAL COMPUTER KEYBOARD

TECHNICAL FIELD

The present invention relates to a personal computer keyboard suitable for a personal computer: especially notebook and portable personal computers, which are both compact.

BACKGROUND PRIOR ART

Since many of heat generating devices such as CPU, a CD-ROM drive and a hard disk are incorporated in a personal computer, there is a need to dissipate generated heat so as to cool the devices in order to ensure normal operations over a long time. For this reason, various kinds of heat dissipating plates have been employed. However, especially, in notebook and portable personal computers, it is unavoidable that the heat generating devices are put inside a small case and a keyboard coexists in the case; many of the heat generating devices are resulted in being crammed in the narrow space, thereby leading to a desire for high heat dissipativity of a heat dissipating plate.

In the mean time, in the keyboard of a personal computer, since key caps with which fingers are put in direct touch are mounted on a base plate with a membrane or a pantograph structure interposed therebetween, and it is required that when a key is pressed down in typing, the base plate do not locally sink due to deformation, therefore a reinforcement plate is disposed on the lower side of the base plate to increase stiffness and cope with such a deformation. Such base and reinforcement plates each have a requirement for having a function as a heat dissipating member to prevent overheating inside the personal computer from occurring by diffusing heat generated from the devices therein in addition to a function as a strength member that supports the key caps and endure shocks of key strokes. Further, needless to say that the light weight and formability of the base and reinforcement plates are necessary.

For such reasons as described above, as material of the base and reinforcement plates, there have widely been adopted an Al—Mg based alloy including aluminum excellent in strength, good in thermal conductivity, and with features of light weight and good forming workability, and Mg in content of about 2.5 wt % especially to increase a mechanical strength.

While such an Al—Mg alloy has a sufficient strength and a good machinability including an excellent cutting property as compared with pure aluminum, the alloy has not been a satisfactory material in terms of heat dissipativity since a thermal conductivity thereof is lower by about 60%. Because of the poor heat dissipativity, the alloy has had a problem in a personal computer using the base and reinforcement plates made of the same since there arise overheating of CPU and other devices, and some of caps with high temperature are locally found in the entire arrangement.

Under such circumstances, the present inventor has proposed an Al—Si—Mg based alloy that seeks a heat dissipativity of pure aluminum, and a strength and machinability of the Al—Mg based alloy. Such a proposed Al—Si—Mg based alloy actually has a good thermal conductivity whereas the alloy is to some extent inferior to the Al—Mg based alloy in regard to a strength and thereby, the problems of overheating of CPU and other devices and caps of high temperature have almost been solved. However, part of the problems have still been left unsolved: Homogeneity in heat dissipation is insufficient and there are still locally found some key caps with high temperature, though, according to distances from the heat generating devices in a personal computer during its operation.

SUMMARY OF THE INVENTION

The present invention has been made in light of such technical circumstances and it is accordingly an object of the present invention to provide a personal computer keyboard with incorporated base and reinforcement plates excellent in heat dissipativity, homogeneous in heat dissipation and having a mechanical strength.

A personal computer keyboard of the present invention, which has been provided for achieving the object, comprises: a base plate 24 on which key caps K1 to K9 are mounted; and a reinforcement plate 25 disposed on the lower side of the base plate 24, wherein the base plate 24 is constituted of an Al—Mg—Si based alloy plate including 0.2 to 0.8 wt % of Si, 0.3 to 0.9 wt % of Mg, 0.35 wt % or less of Fe and 0.20 wt % or less of Cu with the rest of Al and inevitable impurities and wherein the reinforcement plate 25 is constituted of a heat pipe panel.

Further, a content of Si in the Al—Mg—Si based alloy plate is preferably in the range of from 0.32 to 0.60 wt %.

Still further, a content of Mg in the Al—Mg—Si based alloy plate is preferably in the range of from 0.35 to 0.55 wt %.

Yet further, the base plate is preferably constituted of the Al—Mg—Si based alloy plate whose tensile strength is equal to or higher than 200 N/mm$^2$.

Yet further, the reinforcement plate preferably is a heat pipe panel of a structure that is formed by bonding two aluminum flat plates and has an inflated tubular path serving as a path for a working fluid or a heat pipe panel of a structure that has a pipe serving as a path for a working fluid attached on an aluminum flat plate.

DESCRIPTION OF THE PREFERRED EMBODIMENT

The term 'aluminum' is herein used in the meanings including aluminum and an alloy thereof.

Figure 1:
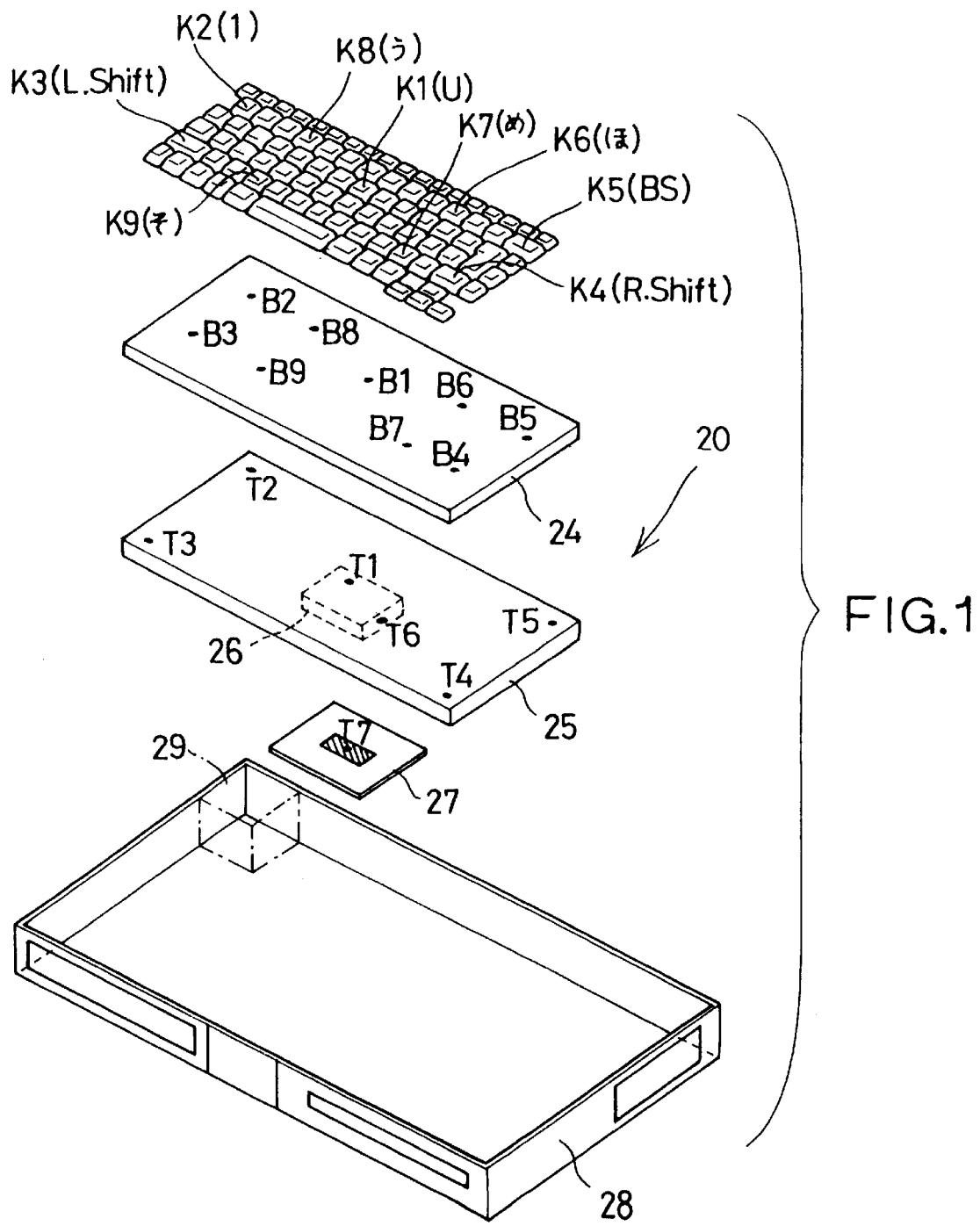
FIG. 1 is an exploded perspective view showing a configuration of an experimental keyboard imitating a note book personal computer.

As shown in FIG. 1, a personal computer keyboard 20 of the present invention has a configuration in which key caps K1 to K9 and so on are mounted on the upper surface of a base plate 24 constituted of an Al—Mg—Si based alloy plate and a reinforcement plate 25 constituted of a heat pipe panel is disposed on the lower side of the base plate 24. Generally, various kinds of heat generating devices such as CPU are arranged below the reinforcement plates 25 and all those are put in a case 28.

The base plate 24 has a shape of a flat plate in order to mount the key caps K1 to K9 and so on thereon and the Al—Mg—Si based alloy employed as a material thereof has a limitation on a chemical composition thereof in order to ensure a strength and a heat dissipativity thereof. Significances of addition of elements and reasons for limitation on contents of the elements will be described below:

Mg and Si are elements necessary for exerting a strength. If an Mg content is less than 0.3 wt % or an Si content is less than 0.2 wt %, a sufficient strength cannot be attained. On the other hand, if an Mg content exceeds 0.9 wt % or an Si content exceeds 0.8 wt %, in the process leading to a plate, not only is productivity reduced due to higher load in hot rolling, but trimming is also required in the course of the rolling due to occurrence of cracks in earrings. Further, if an Mg content is increased to 0.9 wt % or higher, Mg is dissolved into aluminum so as to distort the lattice structure thereof and thereby heat dissipativity is reduced due to hindrance against migration of free electrons. The lower limit of an Mg content is preferably 0.35 wt % and the upper limit thereof is 0.55 wt %. Further, the lower and upper limits of an Si content are preferably 0.32 wt % and 0.60 wt %, respectively.

If Fe and Cu is included a lot, corrosion resistance is reduced and an alloy plate has no value in practical use. Hence, Fe and Cu contents are respectively controlled to be equal to or less than 0.35 wt % and 0.20 wt %, or preferably equal to or less than 0.25 wt % and 0.10 wt %.

Further, the Al—Mg—Si based alloy is used and processed into a flat plate of a predetermined thickness in a normal way including hot rolling and cold rolling of an ingot, whereas the following fabrication process can be recommended in which rollings are performed in predetermined conditions after homogenization in order to not only attain an excellent strength but also fabricate a flat plate in a less number of steps: This process is to deposit $Mg_2Si$ in fine sizes in a homogeneous way by performing rollings under specific conditions and attain a similar effect to that obtained when the alloy is subjected to a solid solution treatment and quench hardening.

That is, after homogenization of an Al—Mg—Si based alloy ingot with the above described composition, in any pass of preliminary hot rolling, not only is a temperature of the material prior to the pass adjusted to be in the range of from 350 to 440° C., but a thickness of a rolled plate after the pass is controlled to be equal to or less than 10 mm and following the preliminary hot rolling, a finish hot rolling is applied to the plate, followed by a cold rolling at a thickness reduction of 30% or more and further followed by mechanical processing to attain an alloy plate of a desired shape.

In the preliminary hot rolling, a similar effect to quench hardening is obtained in any pass of the rolling by a fall in temperature during the pass under a predetermined temperature condition. Therefore, it is required that the material prior to a pass is at a temperature at which Mg and Si each can be held in a solid solution state in conformity with a solid solution treatment: the material is at temperature in the range of from 350 to 440° C. If the material is at a temperature lower than 350° C., $Mg_2Si$ is deposited in coarse sizes, which makes it impossible to obtain a quench hardening effect in a following pass. Further, since a temperature is low, not only rolling workability in the pass is greatly degraded, but a temperature after completion of the pass is too low, so that a surface quality is worsened. On the other hand, if a temperature exceeds 440° C., an after-pass temperature of the material does not sufficiently decrease, thus leading to a poor quench hardening effect. In order to attain a quench hardening effect, a cooling speed during a pass is preferably equal to or higher than 50° C./min and a temperature after the pass is preferably in the range of from 250 to 340° C. It should be noted that in order to control a temperature after a pass in the above described range, a high pressure wafer shower cooling may be applied directly after the preliminary hot rolling. Further, a rolling speed in passes is preferably equal to or higher than 50 m/min. In addition, in order to achieve a cooling effect equivalent to a quench hardening effect during a pass, there is a necessity to control an after-pass thickness of a plate equal to or less than 10 mm. This is because if an after-pass thickness exceeds 10 mm, it is hard to cool the plate to a temperature which is sufficient for attaining the above described quench hardening effect even in a case where a water cooling step is incorporated in the process.

It should be noted that while a preliminary hot rolling is normally performed in 10 passes, a pass in the above described conditions in order to attain a quench hardening effect may be performed in any stage of the process. Because of a condition of an after-pass thickness being equal to or less than 10 mm, quench hardening is performed in the last pass in the most cases and also in one of passes prior to the last pass in the second most cases.

In cold rolling, it is required to select a thickness reduction to be equal to or higher than 30% in order to obtain a predetermined strength by work hardening. With the thickness reduction of 30% or higher, a tensile strength equal to or higher than 200 $N/mm^2$ matching to that of an Al—Mg based alloy can be attained. A thickness reduction is preferably equal to or higher than 50%.

Further, as the reinforcement plate 25, a heat pipe panel is employed that can realize not only stiffness, but also a heat dissipativity and homogeneity in heat dissipation more excellent than a flat plate. This is because the heat pipe panel is superior to a simple flat panel in heat dissipativity and therefore has conspicuously large effect of preventing overheating of CPU and other devices, and local presence of some key caps with high temperature from occurring. While there is no specific limitation on a shape, state and fabrication process of the heat pipe panel as far as the heat pipe panel is of a flat plate, the following are exemplified: a roll-bond heat pipe panel of a structure in which two flat plate of aluminum or the like is bonded and a tubular path is inflated, or a panel of a structure in which a heat pipe as a path of a working fluid is fixed by squeezing or the like on a surface of a flat plate of aluminum or the like. In regard to kinds of material, although a strength that the reinforcement plate 25 should have is required, a thermal conductivity as high as the base plate as described above is not required since an excellent heat dissipativity as a heat pipe panel can be exerted. As materials that satisfies such conditions, there can be recommended pure aluminum, an Al—Mn based alloy and so on, and needless to say that the above described Al—Mg—Si based alloy excellent in thermal conductivity may be employed, by which more excellent heat dissipativity can be expected.

A personal computer keyboard of the present invention is provided with not only a strength by which key stroke in typing mechanically can be endured, but an excellent heat dissipativity that can be exerted so as to remove heat generated from a variety of devices by using an Al—Mg—Si based alloy including 0.2 to 0.8 wt % of Si, 0.3 to 0.9 wt % of Mg, 0.35 wt % or less of Fe and 0.20 wt % or less of Cu with the rest of Al and the inevitable impurities as a material of the base plate. Further, with restriction on Fe and Cu contents in the base plate, corrosion resistance sufficient in practical use can be attained. Furthermore, with the heat pipe panel as a reinforcement plate in use, not only are a strength as a reinforcement member and a heat dissipativity as a heat dissipating member excellent but homogeneity in heat dissipation is also encouraged. For the reasons, not only is a long lasting normal operation of a personal computer maintained by preventing overheating of CPU and other devices therein, but key caps are prevented from being partly heated to high temperature and homogeneous heating of all the key caps can realized. Further, with such excellent heat dissipativity of the base and reinforcement plates, those can preferably employed in not only a notebook personal computer but a portable personal computer in each of which many of heat generating devices are crammed in a small case.

EXAMPLE

Then, detailed description will be made of a concrete example of a personal computer keyboard of the present invention with reference to the accompanying drawings:

In this example, various kinds of base and reinforcement plates were compared with one another in terms of heat dissipativity in a notebook personal computer that requires a high heat removal performance since many of heat generating devices are put in a narrow space thereof.

In the examples, an experimental keyboard 20, as shown in FIG. 1, imitating a notebook personal computer was employed. In the keyboard 20, many key caps K1 to K9 and so on are mounted on the upper surface of a base plate 24 with a membrane or a pantograph structure (not shown) interposed therebetween and CPU 27 is mounted on the rear surface of a reinforcement plate 25 in pantograph structure (not shown) interposed therebetween and CPU 27 is mounted on the rear surface of a reinforcement plate 25 in the middle thereof with a heat spreader 26 interposed therebetween. A clearance of 0.5 mm in width is provided between the base plate 24 and reinforcement plate 25, and the base plate 24 and reinforcement plate 25 are put in a case 28 while superimposing on each other. Further, a fan 29 is disposed in one corner of the case 28 for acceleration of removal of heat. It should be noted that in FIG. 1, key names on the key caps K1 to K9 and so on and locations thereof correspond to the Japanese key arrangement.

Figure 2:
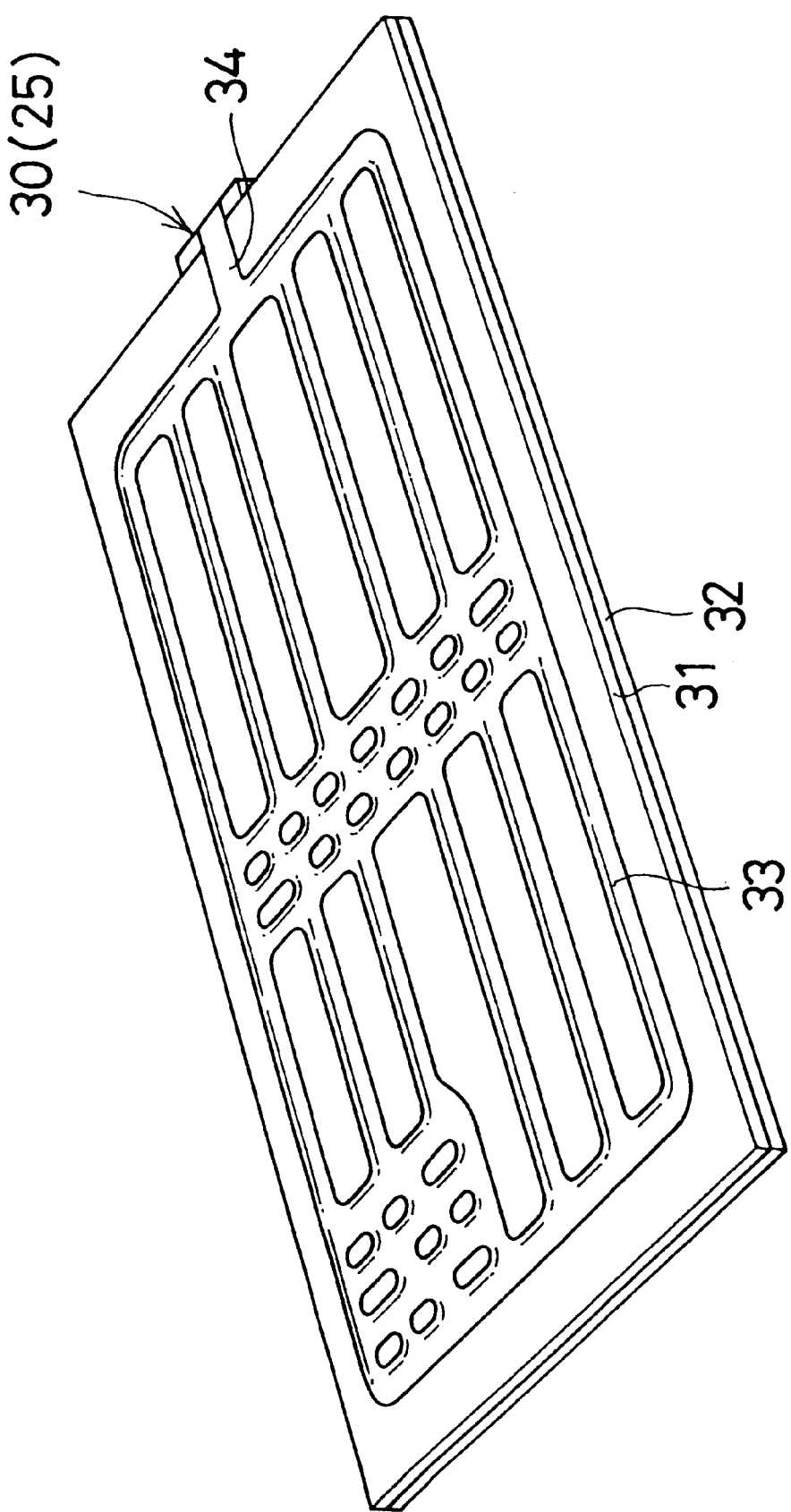
FIG. 2 is a perspective view of a heat pipe panel used as a reinforcement plate.

In the keyboard 20, two kinds of base plates 24 were prepared: one was an Al—Mg—Si based alloy flat plate of a thickness of 0.6 mm and the other was an Al—Mg—Cr alloy flat plate including 2.5 wt % of Mg and 0.25 wt % of Cr (heat-refined H38) of a thickness of 0.6 mm. Further, two kinds of heat pipe panels 30 shown in FIG. 2 as the reinforcement plate 25 were prepared: one was an Al—Mg—Si based alloy flat plate of a thickness of 0.6 mm and the other was an Al—Mg—Cr alloy flat plate including 2.5 wt % of Mg and 0.25 wt % of Cr of a thickness of 0.6 mm.

The Al—Mg—Si based alloy flat plate had a composition including 0.5 wt % of Si, 0.5 wt % of Mg, 0.15 wt % of Fe and 0.05 wt % of Cu with the rest of Al and the inevitable impurities. An ingot with the composition was surface ground, thereafter subjected to homogenization at 580° C. for 10 hr, after the homogenization hot and cold rolled under predetermined conditions, further annealed as the final step at 140° C. for 5 hr. A plate thus processed was cut to a desired shape. Rolling conditions were a starting temperature of the last pass in the preliminary hot rolling was 395° C., an after-pass temperature was 282° C., an after-pass thickness was 7 mm and further a thickness reduction in the cold rolling after the finish hot rolling was 85%.

Measurements of a tensile strength of the Al—Mg—Si based alloy flat plate and the Al—Mg—Cr alloy flat plate including 2.5 wt % of Mg and 0.25 wt % of Cr were conducted on JIS No. 5 test pieces according to the normal method with the respective results of 281 N/mm$^2$ and 295 N/mm$^2$. It was confirmed that the Al—Mg—Si based alloy flat plate and the Al—Mg—Cr alloy flat plate including 2.5 wt % of Mg and 0.25 wt % of Cr showed almost the same strength as each other.

The heat pipe panel 30 was a roll-bond heat pipe panel and was fabricated in such a way that two aluminum plates 31 and 32 were press-bonded with each other so as to superimpose one on the other, non-bonded parts in the composite plate were inflated toward the upper surface side thereof by applying a pressure through an opening 34 so as to create a path 33 extended longitudinally and laterally over almost the entire surface of the panel, and the opening 34 was closed by welding after a working fluid is filled into the path 33. In the examples of this experiment, the aluminum plates 31 and 32 were made of an Al—Mg—Si based alloy with the same composition as the base plate fan 29 in use was one made by Matsushita Electric Industrial Co., Ltd. with the maximum air volume of 1.4 CFM (Model No. UDQFC3E04), and a heat spreader 26 in use was a pure aluminum plate of a surface area of 31 square mm and a thickness of 1 mm.

The members were used to fabricate 5 kinds of experimental keyboards 20 in combinations shown in Table 1.

TABLE 1

| | Base plate | Reinforcement plate | CPU temperature (° C.) | Keyboard temperature Maximum temperature (° C.) | Highest − lowest temperature difference (° C.) |
|---|---|---|---|---|---|
| Example 1 | Al—Mg—Si based alloy plate, thickness 0.6 mm | Heat pipe panel, Al—Mg—Si based alloy | 91.7 | 55.1 | 1.8 |
| Example 2 | Al—Mg—Si based alloy plate, thickness 0.6 mm | Heat pipe panel, JIS 1050 alloy | 91.1 | 54.9 | 1.7 |
| Comparative example 1 | Al—Mg—Cr based alloy plate, thickness 0.6 mm | Heat pipe panel, Al—Mg—Si based alloy | 93.2 | 56.0 | 4.9 |
| Comparative example 2 | Al—Mg—Si based alloy plate, thickness 0.6 mm | Al—Mg—Si based alloy plate, thickness 0.6 mm | 98.5 | 57.5 | 5.1 |
| Comparative example 3 | Al—Mg—Cr based alloy plate, thickness 0.6 mm | Al—Mg—Cr alloy plate, thickness 0.6 mm | 103.1 | 58.6 | 7.3 |

Temperatures were measured on the key caps K1 to K9, the base plate 24, the reinforcement plate 25, and the heat spreader 26 of each experimental keyboard in a steady state after CPU 27 was turned on under conditions of an environmental temperature 35, and the on or off state of the fan 29. Temperature measuring positions of the key caps K1 to K9 were respectively at the respective upper surfaces thereof and temperature measuring positions B1 to B9 of the base plate 24 were points thereon corresponding to the key caps K1 to K9 in a mirror image relation. The measuring points B1 to B9 of the base plate 24 are shown in FIG. 1 and the names of the key caps corresponding to the measuring positions B1 to B9 are shown in Table 2. Further, as shown in FIG. 1 and Table 3, temperature measuring positions T1 to T5 of the reinforcement plate 25 were at the middle and 4 corners of the upper surface, a temperature measuring point of the heat spreader 26 was T6 and a temperature measuring point of CPU 27 was T7.

Temperature measurement results are shown in Tables 2 and 3. Of the measurement results, a temperature of CPU 27 when the fan 20 was off is also shown in Table 1 and differences in temperature between the highest temperature and lowest temperature of the key caps K1 to K9 are shown in Table 1.

TABLE 2

| Key cap (° C.) | Position | | U K1 | 1 K2 | L. Shift K3 | R. Shift K4 | BS K5 | ほ (ho) K6 | め (me) K7 | う (u) K8 | そ (so) K9 |
|---|---|---|---|---|---|---|---|---|---|---|---|
| | Example 1 | ON | 44.4 | 43.3 | 43.9 | 45.1 | 42.9 | 43.8 | 45.4 | 43.3 | 44.7 |
| | | OFF | 53.6 | 53.3 | 54.0 | 55.1 | 54.0 | 53.9 | 55.1 | 54.2 | 54.0 |
| | Example 2 | ON | 43.1 | 44.3 | 44.0 | 44.8 | 44.3 | 43.3 | 44.8 | 43.4 | 44.3 |
| | | OFF | 53.2 | 53.4 | 54.3 | 54.8 | 54.2 | 53.3 | 54.9 | 53.3 | 54.1 |
| | Comparative example 1 | ON | 43.9 | 43.5 | 45.3 | 44.2 | 42.0 | 43.4 | 45.1 | 43.4 | 45.0 |
| | | OFF | 51.8 | 54.6 | 56.0 | 53.8 | 51.1 | 53.9 | 54.2 | 53.5 | 54.0 |
| | Comparative example 2 | ON | 47.7 | 44.3 | 44.5 | 45.9 | 43.9 | 44.8 | 46.7 | 44.3 | 46.8 |
| | | OFF | 56.5 | 54.2 | 55.3 | 54.4 | 52.9 | 53.8 | 54.3 | 52.4 | 55.7 |
| | Comparative example 3 | ON | 50.8 | 42.1 | 44.0 | 44.0 | 42.5 | 44.7 | 47.2 | 44.1 | 47.5 |
| | | OFF | 58.6 | 52.5 | 53.0 | 51.5 | 51.3 | 53.0 | 54.2 | 51.9 | 56.1 |

| Base plate (° C.) | Position | | U B1 | 1 B2 | L. Shift B3 | R. Shift B4 | BS B5 | ほ (ho) B6 | め (me) B7 | う (u) B8 | そ (so) B9 |
|---|---|---|---|---|---|---|---|---|---|---|---|
| | Example 1 | ON | 52.0 | 50.2 | 51.9 | 52.3 | 50.9 | 50.6 | 52.5 | 50.7 | 52.5 |
| | | OFF | 64.8 | 63.4 | 64.9 | 65.0 | 64.0 | 63.7 | 65.1 | 63.9 | 65.2 |
| | Example 2 | ON | 50.7 | 50.6 | 51.3 | 51.2 | 51.4 | 50.5 | 51.6 | 51.9 | 51.5 |
| | | OFF | 63.8 | 63.9 | 64.5 | 64.7 | 64.2 | 63.9 | 64.6 | 64.1 | 64.0 |
| | Comparative example 1 | ON | 51.8 | 50.7 | 53.5 | 52.2 | 49.5 | 49.9 | 52.4 | 51.0 | 53.1 |
| | | OFF | 64.8 | 64.1 | 66.5 | 63.8 | 61.8 | 62.8 | 64.6 | 64.4 | 66.0 |
| | Comparative example 2 | ON | 56.6 | 51.3 | 52.6 | 51.8 | 51.0 | 52.2 | 54.1 | 53.1 | 55.7 |
| | | OFF | 68.8 | 62.8 | 64.1 | 63.2 | 63.1 | 64.4 | 65.8 | 65.1 | 67.3 |
| | Comparative example 3 | ON | 62.7 | 50.2 | 51.4 | 50.9 | 49.8 | 52.5 | 54.0 | 53.3 | 55.7 |
| | | OFF | 75.2 | 61.6 | 61.9 | 61.8 | 61.7 | 64.9 | 65.5 | 65.3 | 66.8 |

*1: According to the Japanese key arrangement.; and *2: ほ (ho), め (me), う (u), そ (so) are Japanese phonetic symbols or hiragana characters (expressed in Roman letters).

TABLE 3

| Reinforcement plate (° C.) | Position | | T1 | T2 | T3 | T4 | T5 | T6 (Heat spreader) | T7 (CPU) |
|---|---|---|---|---|---|---|---|---|---|
| | Example 1 | ON | 69.8 | 58.4 | 60.4 | 56.6 | 59.5 | 67.9 | 78.3 |
| | | OFF | 82.9 | 73.4 | 73.0 | 70.0 | 73.1 | 81.6 | 91.7 |
| | Example 2 | ON | 69.2 | 58.6 | 59.6 | 57.2 | 59.8 | 68.1 | 77.5 |
| | | OFF | 82.2 | 73.8 | 73.3 | 70.3 | 73.5 | 81.0 | 91.1 |
| | Comparative example 1 | ON | 70.4 | 58.6 | 59.8 | 57.9 | 61.9 | 68.2 | 78.8 |
| | | OFF | 85.1 | 73.8 | 75.7 | 71.7 | 76.1 | 83.0 | 93.2 |
| | Comparative example 2 | ON | 79.7 | 50.9 | 52.0 | 53.2 | 54.1 | 74.8 | 84.9 |
| | | OFF | 92.7 | 64.7 | 63.7 | 64.7 | 65.1 | 88.2 | 98.5 |
| | Comparative example 3 | ON | 82.0 | 49.0 | 50.8 | 52.9 | 53.8 | 78.3 | 89.3 |
| | | OFF | 94.8 | 62.5 | 61.7 | 63.3 | 64.4 | 91.7 | 103.1 |

From the results of Tables 1 to 3, it was able to be confirmed that the keyboards using the base plates 24 made of the Al—Mg—Si based alloy of a predetermined composition and the reinforcement plates 25 of the flat plate heat pipe were excellent in heat dissipativity and temperature homogeneity: with small temperature differences between key caps K1 to K9 in different positions. Incidentally, while the highest permissible temperature at which CPU operates in a normal state is 100° C., it was confirmed that temperatures was able to be cooled with a sufficient margin so that CPU normally operated even in a sever condition in which the fan was off.

Further, in key strokes, there was observed no deformation of the base plate in any keyboard.

Vernaculars used herein are used only for description, but not for limitation in interpretation. Further, it should be recognized that the descriptions of the preferred embodiment are not intended to exclude any of equivalents to the features shown and described therein and a variety of alterations and modifications thereof may be made in the present invention without departing from the scope thereof.

What is claimed is:

1. A personal computer keyboard comprising: a base plate 24 on which key caps K1 to K9 are mounted; and a reinforcement plate 25 disposed on the lower side of the base plate 24, wherein the base plate 24 is constituted of an Al—Mg—Si based alloy plate including 0.2 to 0.8 wt % of Si, 0.3 to 0.9 wt % of Mg, 0.35 wt % or less of Fe and 0.20 wt % or less of Cu with the rest of Al and inevitable impurities and wherein the reinforcement plate 25 constitutes a heat pipe panel.

2. A personal computer keyboard according to claim 1, wherein a content of Si in the Al—Mg—Si based alloy plate is in the range of from 0.32 to 0.60 wt %.

3. A personal computer keyboard according to claim 1 or claim 2, wherein a content of Mg in the Al—Mg—Si based alloy plate is in the range of from 0.35 to 0.55 wt %.

4. A personal computer keyboard according to claim 2, wherein a content of Mg in the Al—Mg—Si based alloy plate is in the range of from 0.35 to 0.55 wt %.

5. A personal computer keyboard according to claim 1, wherein the base plate is constituted of the Al—Mg—Si based alloy plate whose tensile strength is equal to or higher than 200 N/mm$^2$.

6. A personal computer keyboard according to claim 2, wherein the base plate is constituted of the Al—Mg—Si based alloy plate whose tensile strength is equal to or higher than 200 N/mm$^2$.

7. A personal computer keyboard according to claim 3, wherein the base plate is constituted of the Al—Mg—Si based alloy plate whose tensile strength is equal to or higher than 200 N/mm$^2$.

8. A personal computer keyboard according to claim 4, wherein the base plate is constituted of the Al—Mg—Si based alloy plate whose tensile strength is equal to or higher than 200 N/mm$^2$.

9. A personal computer keyboard according to claim 1, wherein the reinforcement plate is a heat pipe panel of a structure that is formed by bonding two aluminum flat plates and has an inflated tubular path serving as a path for a working fluid.

10. A personal computer keyboard according to claim 1, wherein the reinforcement plate is a heat pipe panel of structure that has a pipe serving as a path for a working fluid attached on an aluminum flat plate.

* * * * *